United States Patent [19]

Konecsny

[11] Patent Number: 5,358,185
[45] Date of Patent: Oct. 25, 1994

[54] METHOD OF DIGESTING WASTE PAPER

[75] Inventor: Helmut Konecsny, Baulkham Hills, Australia

[73] Assignee: J. M. Voith GmbH, Heidenheim, Fed. Rep. of Germany

[21] Appl. No.: 159,431

[22] Filed: Nov. 29, 1993

[30] Foreign Application Priority Data

Dec. 5, 1992 [DE] Fed. Rep. of Germany ....... 4241039
Feb. 25, 1993 [DE] Fed. Rep. of Germany ....... 4305687

[51] Int. Cl.$^5$ .................... B02C 11/08; B07K 7/00
[52] U.S. Cl. ........................ 241/18; 241/21; 241/23; 241/28
[58] Field of Search ............... 241/17, 18, 21, 23, 241/28

[56] References Cited

U.S. PATENT DOCUMENTS

| | | | |
|---|---|---|---|
| 3,891,497 | 6/1975 | Daane et al. | 241/28 X |
| 3,910,505 | 10/1975 | Reinhall | 241/18 |
| 3,948,449 | 4/1976 | Logan et al. | 241/28 X |
| 4,009,835 | 3/1977 | Syrjanen | 241/28 |
| 4,037,792 | 7/1977 | Peterson | 241/28 X |

FOREIGN PATENT DOCUMENTS 1462995 1/1977 United Kingdom .

OTHER PUBLICATIONS

Mack, H., Papiertechnische Biobliothek, vol. 1, "Altpapieraufbereitung," pp. 89–92.

Primary Examiner—Timothy V. Eley
Attorney, Agent, or Firm—Marshall, O'Toole, Gerstein, Murray & Borun

[57] ABSTRACT

A method of digesting waste paper is disclosed wherein waste paper is digested in a gas-tight container at an elevated pressure supplied by compressed gas introduced to the container. The digestion mixture is circulated within the pulper by a rotor having vanes or helical surfaces.

9 Claims, 1 Drawing Sheet

METHOD OF DIGESTING WASTE PAPER

BACKGROUND OF THE INVENTION

1. Field of the Invention

The invention relates to a method of digesting waste paper.

2. Description of Related Technology

Generally, waste paper is digested in pulpers at atmospheric pressure at temperatures between 30° C. and 45° C.

There has also been a proposal to digest waste paper in a pulper with a spherical housing, in which removal of specks may also be performed. (See H. Mack, *Altpapieraufbereitung*, page 90.) This pulper has a cover, with which the pulper can be sealed.

SUMMARY OF THE INVENTION

An object of the invention is to render the digesting of waste paper more effective.

According to the invention this waste paper is digested in a gas-tight container at an elevated pressure utilizing a rotor having vanes or helical surfaces for effecting circulation. The elevated pressure (preferably about 0.3 bar to about 4 bar) is provided by compressed gas.

DETAILED DESCRIPTION OF A PREFERRED EMBODIMENT

According to this invention, waste paper and digesting liquid (i.e. water and conventional chemicals) are introduced to a pulper container in addition to compressed gas (e.g. compressed air or high pressure steam). The compressed gas may be introduced after the pulper has been sealed with a cover, which is generally disposed at the top of the pulper. Digestion is performed extremely effectively using a normal pulper rotor. It is possible to supply the gas (e.g. steam) at temperatures between about 50° C. and about 150° C. In the case of both steam and compressed gas there is the advantage that the container may be emptied without an additional pump.

Figure 1:
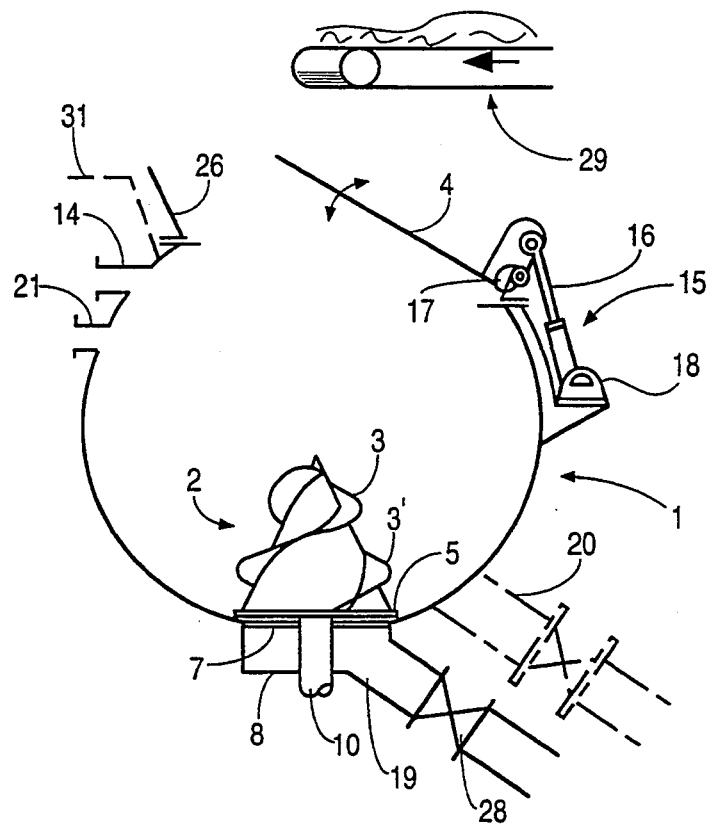
FIG. 1 is a schematic depiction of a digester useful in carrying out the method of the invention.

The invention will be described with reference to the working embodiment illustrated diagrammatically in FIG. 1. A pulper comprises a substantially spherical container 1 with a cover door 4 and a charging hopper 26. The pulper has at its bottom a rotor 2 with helical ribs 3 and 3' for effecting circulation. (The rotor 2 may utilize vanes or other types of helical surfaces as desired.) The rotor rotates on a base plate 5 over a sieve 7, which covers a pulp draw-off chest 8. The rotor is driven by means of a shaft 10 from a motor (not shown). The draw-off of the digested pulp takes place through a duct 19, after it has passed through the sieve 7 and after opening of a valve 28 disposed in the duct 19.

The cover 4 is actuated by a piston rod 16 of a hydraulic piston and cylinder unit 15, which is pivoted in an articulating fashion on a bearing 18. The cover 4 is connected pivotally by a rotary joint 17 with the container 1. It is possible to introduce high pressure steam or compressed gas through a port 14, and water may be supplied through a port 21. A feed duct for chemicals is indicated at 31.

Waste paper is supplied through the hopper 26, via a conveyor belt 29, for example. As soon as sufficient waste paper is present in the container 1, the cover 4 is closed and compressed gas, e.g. high pressure steam, is fed to the pulper through the duct 14 at a pressure between about 0.3 bar and about 5 bar (preferably about 1.2 bar to about 4 bar), inclusive, and a temperature between about 50° C. and about 150° C., and preferably between about 100° C. and about 130° C. As a compressed gas it is possible to utilize compressed air, as is normally readily available in a factory.

The consistency of the mixture to be digested is preferably at least about 12 wt. %, and highly preferably about 12 wt. % to about 16 wt. %, although it is possible to digest at consistencies of up to 25 wt. %. When the digestion operation has proceeded to a sufficient degree, the valve 28 is opened for discharge of the digested waste paper from the container 1 via the duct 19, at which time the rotor 2 rotates to prevent the sieve from becoming clogged. The remaining, poorly digested waste paper can be drawn off via the duct 20. It is feasible to omit the sieve 7 and the duct 19 and substantially digest the waste paper and then discharge it via the duct 20 alone. The digested waste paper, i.e. the waste paper suspension, may (like chemical pulp in the case of a digester) be blown into a receiving container (e.g. a blowing tank). Owing to the high pressure or, respectively, the higher temperature the action of the chemicals is extremely effective and therefore the digestion effect is comparatively superior. Thus, it is possible to empty the container 1 between individual digesting cycles.

A further substantial advantage is that adhesives such as latex, wax and the like are finely dispersed without a separate dispersing device having to be employed.

Figure 2:
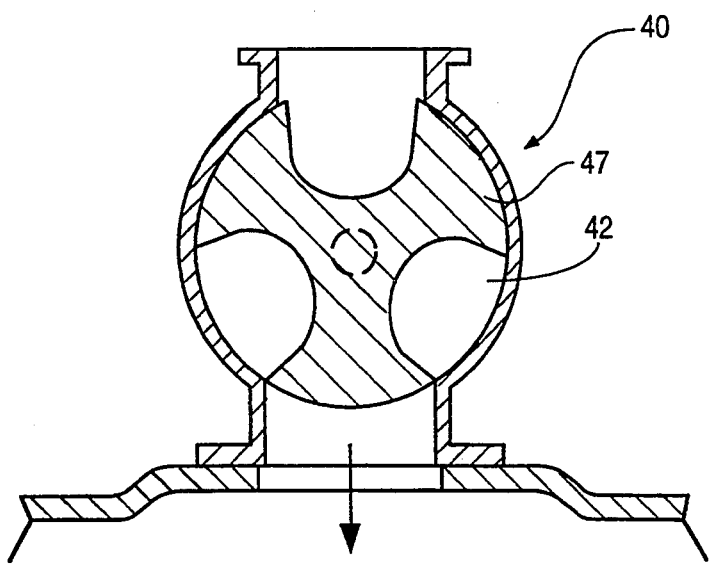
FIG. 2 is a sectional depiction of a cell feeder useful in continuously feeding waste paper to the digester of FIG. 1.

In place of the conveyor belt 29 and the charging hopper 26, continuous feed of waste paper to the pulper is possible by a compacting worm feeder such as disclosed in GB 1,462,995 (Jan. 26, 1977) and its counterpart U.S. Pat. No. 3,910,505 (Oct. 7, 1975), the respective disclosures of which are incorporated herein by reference, by a rotary paddle valve, or by a cell-feeder 40 according to FIG. 2 with the cells 42 formed by the cell wheel 41 in cooperation with a feeder housing.

The worm feeder, paddle valve, or cell feeder would communicate with the interior of the pulper 1 through a duct (not shown).

I claim:

1. A method of digesting waste paper comprising the step of digesting waste paper in a gas-tight pulper container under a gauge pressure of between about 0.3 bar and about 4 bar with circulation within the container provided by a rotor provided with vanes or helical surfaces, said gauge pressure being produced by the introduction of compressed gas into said container.

2. The method of claim 1 wherein said compressed gas comprises compressed air or high pressure steam.

3. The method of claim 1 wherein the container is emptied between individual digesting cycles.

4. The method of claim 1 wherein said digestion step is carried out continuously using waste paper supply means comprising a rotary paddle valve or a transfer passage with a worm or cell feeder communicating with the interior of said container.

5. The method of claim 1 wherein the digestion step is performed at between about 50° C. and about 150° C.

6. The method of claim 5 wherein said digestion step is carried out at between about 100° C. and about 130° C.

7. The method of claim 1 wherein no dispersing operation is performed downstream from the pulper container.

8. The method of claim 1 wherein the digestion in the pulper takes place at a consistency of at least about 12 wt. %.

9. The method of claim 1 wherein the digestion in the pulper takes place at a consistency of between about 12 wt. % and about 25 wt. %.

* * * * *